(12) United States Patent
Koseoglu et al.

(10) Patent No.: US 12,109,559 B2
(45) Date of Patent: Oct. 8, 2024

(54) SLURRY-PHASE CATALYST COMPOSITIONS AND METHODS OF MAKING

(71) Applicant: Saudi Arabian Oil Company, Dhahran (SA)

(72) Inventors: Omer Refa Koseoglu, Dhahran (SA); Ashok Kumar Punetha, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/689,003

(22) Filed: Mar. 8, 2022

(65) Prior Publication Data
US 2023/0285952 A1    Sep. 14, 2023

(51) Int. Cl.
| | | |
|---|---|---|
| *B01J 37/03* | (2006.01) | |
| *B01J 23/28* | (2006.01) | |
| *B01J 37/04* | (2006.01) | |
| *B01J 37/08* | (2006.01) | |

(52) U.S. Cl.
CPC ............. *B01J 37/038* (2013.01); *B01J 23/28* (2013.01); *B01J 37/04* (2013.01); *B01J 37/08* (2013.01)

(58) Field of Classification Search
CPC . B01J 37/038; B01J 37/04; B01J 37/08; B01J 23/28; B01J 2531/64; B01J 27/051; B01J 31/022; B01J 31/20; B01J 31/2234; B01J 35/30; C10G 47/06; C10G 47/26
See application file for complete search history.

(56) References Cited

U.S. PATENT DOCUMENTS

| | | | | |
|---|---|---|---|---|
| 5,578,197 | A * | 11/1996 | Cyr ........................ | C10G 47/26 208/112 |
| 8,673,130 | B2 | 3/2014 | Lott et al. | |
| 2008/0305947 | A1* | 12/2008 | Chen ...................... | C10G 49/12 502/316 |
| 2020/0094239 | A1 | 3/2020 | Do et al. | |
| 2020/0181506 | A1* | 6/2020 | Koseoglu ............... | C10G 21/22 |
| 2021/0002563 | A1* | 1/2021 | Park ........................ | B01J 37/20 |

OTHER PUBLICATIONS

Nguyen et al., "A review on the oil-soluble dispersed catalyst for slurry-phase hydrocracking of heavy oil", Journal of Industrial and Engineering Chemistry, vol. 43, pp. 1-12, 2016.
Prajapati et al., "Slurry phase hydrocracking of heavy oil and residue to produce lighter fuels: An experimental review", Fuel, vol. 288, 119686, pp. 1-23, 2021.
Zhang et al., "A review of Slurry-Phase Hydrocracking Heavy Oil Technology", Energy & Fuels, vol. 21, No. 6, pp. 1-6, Nov./Dec. 2007.
Saudi Arabia Office Action pertaining to Application No. 123441376 dated Dec. 25, 2023, 13 pages.

* cited by examiner

*Primary Examiner* — Samir Shah
*Assistant Examiner* — Jordan W Taylor
(74) *Attorney, Agent, or Firm* — Dinsmore & Shohl LLP

(57) ABSTRACT

This disclosure relates to slurry-phase catalyst compositions comprising a metal complex and disulfide oil, and methods of making said compositions in slurry-phase hydrocracking units.

20 Claims, 2 Drawing Sheets

SLURRY-PHASE CATALYST COMPOSITIONS AND METHODS OF MAKING

FIELD

Embodiments disclosed herein generally relate to hydrocarbon processing, and more specifically to catalyst compositions for hydrocarbon processing.

TECHNICAL BACKGROUND

A variety of methods are used to process hydrocarbon streams. Purification techniques can be used to remove undesired materials from hydrocarbon streams. For instance, mercaptans, which contain sulfur molecules, may be present in crude oil sources. Due to regulatory requirements, the reduction of sulfur in hydrocarbon streams may be desired. Mercaptan oxidation (MEROX) processes may be used to remove mercaptans from hydrocarbon streams. The MEROX reactions convert mercaptans from a variety of hydrocarbon streams, such as liquefied petroleum gas, naphtha, or any other hydrocarbon fraction, such that the mercaptans may be removed from the hydrocarbon feed.

SUMMARY

Disulfide oil compounds are produced as a by-product of the MEROX process. However, this results in an additional waste product that must be disposed of accordingly. Additionally, rising demand for transportation fuels and increasing stocks of high sulfur residual oil have resulted in a renewed interest in the processing of heavy residue to generate useful lighter fuels and chemicals. Residual oils are of low quality because of the presence of impurities like Conradson carbon residue (CCR), asphaltenes, sulfur, nitrogen, and heavy metals. Fixed-bed and ebullated-bed technologies are limited in processing these residual oils with high metal content. For instance, ebullated-bed reaction technologies may achieve conversion of up to 65% by volume, but is limited to feedstock with a metal content below 400 parts per million by weight (ppmw). Alternatively, slurry-phase hydrocracking technology has gained attention in recent years due to its flexibility to process heavier feedstock with high metal content to achieve high conversion rates. Slurry-phase hydrocracking technologies may process residual oils containing up to 4,000 ppm of metals and achieve conversion of up to 95% by volume. Therefore, an ongoing need exists for the conversion of the disulfide oil by-products to a useful material for the reduction in waste production while at the same time improving economic viability of slurry-phase hydrocracking.

These needs are met by the embodiments disclosed herein. One or more embodiments disclosed herein provide a method of making a slurry-phase catalyst composition. Other embodiments are directed to a slurry-phase catalyst composition comprising a metal complex and a disulfide oil, positioned in a slurry-phase hydrocracking unit. According to at least one aspect of the present disclosure, a method for making a slurry-phase catalyst composition includes, mixing a metal complex and a disulfide oil in a mixing vessel to form a catalyst composition precursor; heating the catalyst composition precursor to an elevated temperature sufficient to dissolve at least a portion of the metal complex in the disulfide oil to form a mixed catalyst composition, wherein the mixed catalyst composition comprises both a liquid component and a solid component; transferring at least a portion of the mixed catalyst composition to a slurry-phase hydrocracking unit to form the slurry-phase catalyst composition.

According to one or more other aspects, a slurry-phase catalyst composition includes a metal complex and a disulfide oil; wherein the disulfide oil is a reaction product of a mercaptan oxidation reaction, and the metal complex is dissolved in the disulfide oil to form a mixed catalyst composition, and at least a portion of the mixed catalyst composition is transferred to a slurry-phase hydrocracking unit to form the slurry-phase catalyst composition.

This summary is provided to introduce a selection of concepts that are further described in the detailed description. This summary is not intended to identify key or essential features of the claimed subject matter, nor is it intended to be used as an aid in limiting the scope of the claimed subject matter.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

Figure 1:
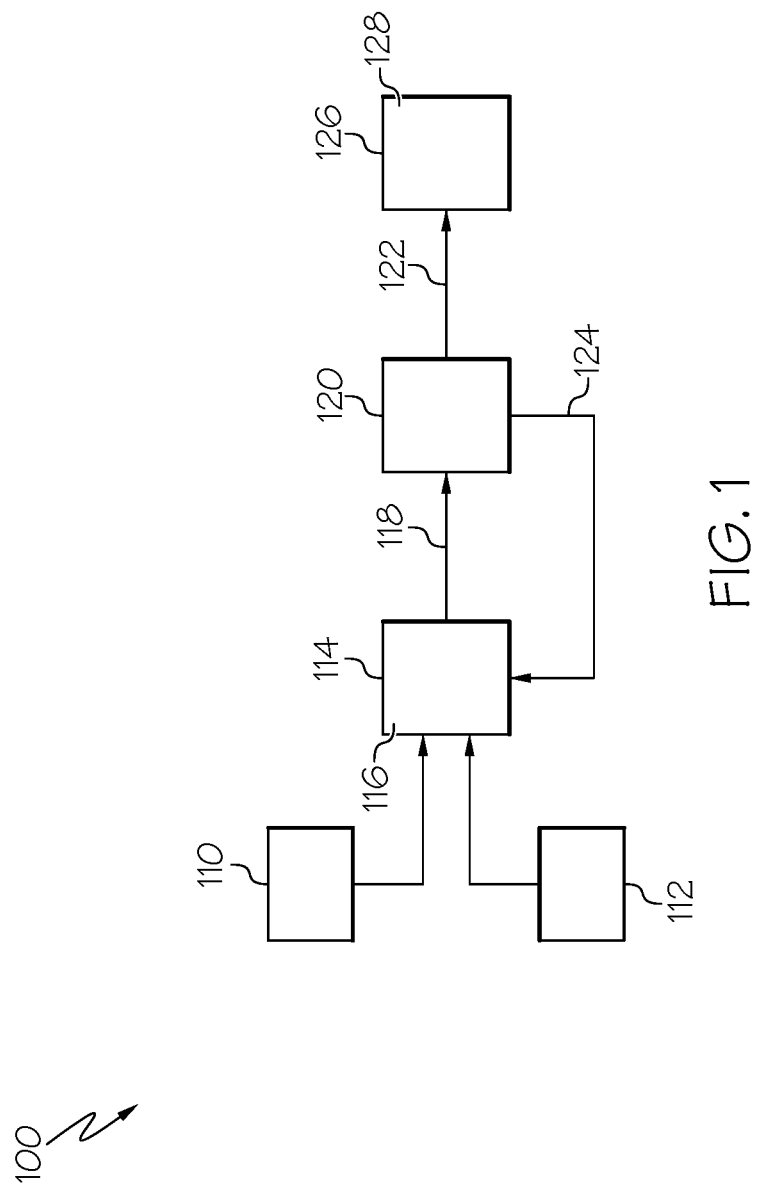
FIG. 1 is a generalized schematic diagram of a method for making a slurry-phase catalyst composition, according to one or more embodiments described herein.

Reference will now be made in greater detail to various embodiments, some embodiments of which are illustrated in the accompanying drawings.

DETAILED DESCRIPTION

Embodiments disclosed herein include a catalyst composition. More specifically, some embodiments disclosed herein are directed toward a method of making a homogenous catalyst composition. Other embodiments are directed toward a homogenous catalyst composition. In some embodiments, a metal complex may be combined with a disulfide oil. In some embodiments, the disulfide oil may be a waste product of a mercaptan oxidation (MEROX) reaction, which may produce more valuable chemical intermediates, such as catalysts, for example, while reducing waste production.

In one or more embodiments, a method of making a slurry-phase catalyst composition may include mixing a metal complex and a disulfide oil in a mixing vessel to form a catalyst composition precursor. The catalyst composition precursor may be heated to an elevated temperature sufficient to dissolve at least a portion of the metal complex in the disulfide oil to form a mixed catalyst composition. The catalyst composition may include both a liquid component and a solid component. At least a portion of the mixed catalyst composition may be transferred to a slurry-phase hydrocracking unit to form the slurry-phase catalyst composition.

In one or more embodiments, a slurry-phase catalyst composition includes a metal complex and a disulfide oil. In some embodiments, the disulfide oil may be a reaction product of a mercaptan oxidation reaction, and the metal complex may be dissolved in the disulfide oil to form a mixed catalyst composition. At least a portion of the mixed catalyst composition may be transferred to a slurry-phase hydrocracking unit to form a slurry-phase catalyst composition.

As used herein, the term "catalyst" may refer to any substance which increases the rate of a specific chemical reaction. Catalysts described in this disclosure may be utilized to promote various reactions, such as, but not limited to, hydrodemetalization, hydrodesulfurization, hydrodenitrogenation, hydrodearomatization, cracking, or combinations thereof. Some catalysts may have multiple forms of catalytic activity, and calling a catalyst by one particular function does not render that catalyst incapable of being catalytically active for other functionality.

As used herein, the term "homogenous catalyst" may refer to a catalyst used in catalysis reactions where the catalyst may be in the same phase as the reactants, which may be in a solution. As used herein, the term "dispersed catalyst" may refer to a catalyst used in catalysis reactions where the catalyst and the reactants are in different phases. As used herein, the term "slurry-phase catalyst composition" may refer to a catalyst operable to increase a reaction rate in a slurry-phase unit, which may include a slurry-phase hydrocracking unit.

As used herein, the term "mercaptan oxidation reaction" (MEROX) may refer to the process of converting mercaptans by oxidation. The MEROX process may use an organometallic catalyst in a basic environment, such as a caustic, to accelerate the oxidation of mercaptans to disulfides at near ambient temperatures and pressures. The overall reaction can be expressed as follows:

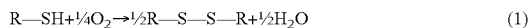

$$R\text{—}SH + \tfrac{1}{4}O_2 \rightarrow \tfrac{1}{2}R\text{—}S\text{—}S\text{—}R + \tfrac{1}{2}H_2O \qquad (1)$$

where R is a hydrocarbon chain that may be straight, branched, or cyclic, and the chains can be saturated or unsaturated. In most petroleum fractions, there will be a mixture of mercaptans such that the R may have from 1 to 20 carbon atoms in the chain. This variable chain length is indicated by R and R' in the reaction. The reaction is then written as:

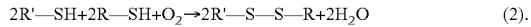

$$2R'\text{—}SH + 2R\text{—}SH + O_2 \rightarrow 2R'\text{—}S\text{—}S\text{—}R + 2H_2O \qquad (2).$$

This reaction occurs spontaneously, but at a very slow rate, whenever any sour mercaptan-bearing distillate is exposed to atmospheric oxygen. In addition, the catalyzed reaction (1) may include an alkali caustic solution, such as sodium hydroxide. The mercaptan oxidation proceeds at an economically practical rate at moderate refinery downstream conditions, such as temperatures up to 200° C., and pressured from 100 kPa (1 bar) to 3,000 kPa (30 bar).

As used herein, the term "disulfide oil" may refer to oils comprising a formula of R—S—S—R', where R and R' are independently $C_1$-$C_{20}$ hydrocarbon chains that may be straight, branched, or cyclic including aromatics, and the chains may be saturated or unsaturated. For example, the disulfide oil may include, but not be limited to, dimethyldisulfide, diethyldisulfide, methylethyldisulfide, or combinations thereof.

As used herein, the term "mixing vessel" may refer to any tank, reservoir, or structure operable to contain disulfide oil, a metal complex, or other catalyst precursor materials, including but not limited to solvents and additives. The mixing vessel may comprise a mixing device operable to mix the contents of the mixing vessel. The mixing vessel may also contain a heating element operable to heat the contents of the mixing vessel.

As used herein, the term, "cracking" generally refers to a chemical reaction where a molecule having carbon-carbon bonds is broken into more than one molecule by the breaking of one or more of the carbon-carbon bonds; where a compound including a cyclic moiety, such as an aromatic compound, is first hydrogenated and then converted to a compound that does not include a cyclic moiety; or where a molecule having carbon-carbon double bonds are reduced to carbon-carbon single bonds As used herein, the term "slurry-phase hydrocracking unit" may refer to a technology that can process residual oils in the presence of slurry or homogeneous catalysts. Benefits of slurry-phase hydrocracking over other technologies may include the ability to process residual oils with a boiling point above 400° C., 450° C. 500° C. 520° C., or 565° C. Further, slurry-phase hydrocracking may be used to process residual oils with a Conradson carbon residue (CCR) concentration greater than 10 weight percent (wt. %). 15 wt. %, 20 wt. %, or even 25 wt. % Slurry-phase hydrocracking may be used to achieve a conversion level as high as 95 volume percent. The catalyst may play a significant role in slurry-phase hydrocracking. A catalyst with greater activity may result in greater yield of light fuel oil and reduced yield of coke. Two types of catalysts for slurry-phase hydrocracking include heterogeneous solid powder catalysts and homogeneous catalysts. However, the former, such as hematite, lignite coke, and red mud are less desirable because of the difficulty in separation and equipment wear caused by the high dosages of these catalysts. Some slurry-phase catalysts may be formulated as water-soluble catalysts or oil-soluble catalysts. Slurry-phase catalysts may include metal compounds, and the metal may be selected from elements of IUPAC groups 4-10 among which may include, among others, molybdenum, nickel, cobalt, tungsten and chromium. The slurry-phase catalyst and feedstock oil may be added into a reactor simultaneously, added separately, or combined and then added to the reactor.

As used herein, a "reactor" refers to any vessel, container, or the like, in which one or more chemical reactions may occur between one or more reactants optionally in the presence of one or more catalysts. For example, a reactor may include a tank or tubular reactor configured to operate as a batch reactor, a continuous stirred-tank reactor (CSTR), or a plug flow reactor. Example reactors include packed bed reactors such as fixed bed reactors, and fluidized bed reactors. One or more "reaction zones" may be disposed within a reactor. As used in this disclosure, a "reaction zone" refers to an area in which a particular reaction takes place in a reactor. For example, a packed bed reactor with multiple catalyst beds may have multiple reaction zones, in which each reaction zone is defined by the area of each catalyst bed.

As used herein, a "separation unit" refers to any separation device that at least partially separates one or more chemicals in a mixture from one another. For example, a separation unit may selectively separate different chemical species from one another, forming one or more chemical fractions. Examples of separation units include, without limitation, distillation columns, fractionators, flash drums, knock-out drums, knock-out pots, centrifuges, filtration devices, traps, scrubbers, expansion devices, membranes, solvent extraction devices, high-pressure separators, low-pressure separators, and the like. It should be understood that separation processes described in this disclosure may not completely separate all of one chemical constituent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided or separated into two or more process streams of desired composition.

As used herein, the term "ligands" may refer to any ion or molecule that binds to a central atom to form a coordination complex. The ligands may be bound to a central metal atom to form a catalyst precursor or a catalyst. Examples of ligands include, without limitation, iodide, bromide, sulfide, thiocyanate, chloride, nitrate, azide, fluoride, hydroxide, oxalate, water, nitrite, isothiocyanate, acetonitrile, pyridine, ammonia, ethylenediamine, 2,2'-bipyridine, 1,10-phenanthroline, nitrile, triphenylphosphine, cyanide, carbon monoxide, acetylacetonate, and organometallic compounds where the metal is bonded to a carbon atom.

As used herein, the term "fluid" may include liquids, gases, or both.

The MEROX process may be conducted on both liquid streams and on combined gas and liquid streams. In the case of liquid streams, the mercaptans may be converted directly to disulfides which remain in the product such that there is no reduction in total sulfur content of the effluent stream. Because the vapor pressures of disulfides are relatively low compared to those of mercaptans, the presence of disulfide oil may result in less odor compared to the mercaptans. However, disposal of disulfide oils may be difficult due to environmental concerns and regulations. The MEROX process may use a fixed bed reactor system for liquid streams and may be employed with charge stocks having end points above 135° C. Mercaptans may include alkane thiolates that may be converted to disulfides in a fixed bed reactor system over a catalyst, for example, an activated charcoal impregnated with a MEROX reagent, and wetted with caustic solution. Air may be injected into the feed hydrocarbon stream ahead of the reactor and in passing through the catalyst-impregnated bed, the mercaptans in the feed may be oxidized to disulfides. The disulfides are substantially caustic insoluble and remain in the hydrocarbon phase. Post treatment may be used to remove undesirable by-products resulting from known side reactions such as the neutralization of $H_2S$, the oxidation of phenolic compounds, entrained caustic, and others. In the case of mixed gas and liquid streams, extraction may be applied to both phases of the hydrocarbon streams. The degree of completeness of the mercaptan extraction depends upon the solubility of the mercaptans in the alkaline solution, which is a function of the molecular weight of the individual mercaptans, the extent of the branching of the mercaptan molecules, the concentration of the caustic soda and the temperature of the system. Thereafter, the resulting disulfide oil compounds may be separated, and the caustic solution may be regenerated by wet air oxidation in the presence of the catalyst and reused. The effluents of the wet air oxidation step in the MEROX process may comprise a minor proportion of sulfides and a major proportion of disulfide oils.

Referring now to FIG. 1, a method of making a slurry-phase catalyst composition 100 is schematically depicted that includes combining a metal complex 110 and disulfide oil 112 in a mixing vessel 114 to form a catalyst composition precursor 116. The catalyst composition precursor 116 may be heated in the mixing vessel 114 to an elevated temperature sufficient to dissolve at least a portion of the metal complex 110 in the disulfide oil 112 to form a mixed catalyst composition 118. In some embodiments, the catalyst composition precursor 116 may be transferred to a separate heating vessel (not pictured) and heated to an elevated temperature sufficient to dissolve at least a portion of the metal complex 110 in the disulfide oil 112 to form a mixed catalyst composition 118.

In some embodiments, the mixed catalyst composition 118 may be transferred to a separation unit 120 where a liquid component and a solid component of the mixed catalyst composition 118 are separated to form a separated liquid component 122 and a separated solid component 124.

In embodiments, the separated liquid component 122 may be transferred to a slurry-phase hydrocracking unit 126 to form a slurry-phase catalyst composition 128. In some embodiments, the separated solid component 124 may be recycled to the mixing vessel 114.

In embodiments, at least a portion of the mixed catalyst composition 118 may be transferred to a slurry-phase hydrocracking unit 126 to form a slurry-phase catalyst composition 128.

In embodiments, the metal complex 110 may comprise one or more transition metals selected from elements of IUPAC groups 4-10, including but not limited to, molybdenum, cobalt, nickel, tungsten, or a combination of two or more thereof. In some embodiments, the metal complex 110 may comprise one or more transition metals selected from the group consisting of molybdenum, cobalt, nickel, tungsten, and a combination of two or more thereof. Without being bound by any particular theory, it is believed that the presence of one or more transition metals in the metal complex 110 may improve the catalytic activity of the mixed catalyst composition 118, the slurry-phase catalyst composition 128, or both the mixed catalyst composition 118 and the slurry-phase catalyst composition 128.

In embodiments, the metal complex 110 may comprise ligands, organometallics, salts, oxides, sulfides, or a combination of two or more thereof. In some embodiments, the metal complex 110 may comprise an organometallic molybdenum hexacarbonyl. In some embodiments, the metal complex 110 may comprise a metal oxide. For example, in some embodiments the metal oxide is molybdenum trioxide. In some embodiments, the metal complex 110 may comprise a metal with ligands comprising oxygen groups, wherein the oxygen groups are bonded to the metal. For example, in some embodiments, the metal complex 110 may comprise bis(acetylacetonato)dioxomolybdenum(VI). In some embodiments, the metal complex 110 is bis(acetylacetonato)dioxomolybdenum(VI). In some embodiments, the metal complex 110 may comprise bis(acetylacetonato)dioxomolybdenum(VI), molybdenum trioxide, molybdenum hexacarbonyl, or a combination of two or more thereof. In some embodiments, the metal complex 110 may be selected from the group consisting of bis(acetylacetonato)dioxomolybdenum(VI), molybdenum trioxide, molybdenum hexacarbonyl, and a combination of two or more thereof.

In embodiments, the disulfide oil 112 is a reaction product of a mercaptan oxidation reaction. In some embodiments, the disulfide oil may comprise compounds of the formula R—S—S—R', where R and R' are independently $C_1$-$C_{20}$ hydrocarbon chains that may be straight, branched, or cyclic, and the chains may be saturated or unsaturated. For example, the disulfide oil may include, but not be limited to, dimethyldisulfide, diethyldisulfide, methylethyldisulfide, or combinations thereof. In embodiments, the disulfide oil 112 may have a metals content up to 500 parts per million by weight (ppmw), 1,000 ppmw, 2,000 ppmw, 3,000 ppmw, or even up to 4,000 ppmw. In embodiments, the metal complex 110 and the disulfide oil 112 are mixed in the mixing vessel 114 that may comprise a mixing device to form the catalyst composition precursor 116.

In embodiments, the catalyst composition precursor 116 may comprise from 100 parts per million by weight (ppmw) to 100,000 ppmw of the metal complex 110. For instance, the catalyst composition precursor 116 may comprise from 100 ppmw to 10,000 ppmw, from 100 ppmw to 50,000 ppmw, from 100 ppmw to 100,000 ppmw, from 1.000 ppmw to 10,000 ppmw, from 1.000 ppmw to 50,000 ppmw, from 1,000 ppmw to 100,000 ppmw, from 5,000 ppmw to 10,000 ppmw, from 5,000 ppmw to 50,000 ppmw, or from 5,000 ppmw to 100,000 ppmw of the metal complex 110.

In embodiments, at least a portion of the metal complex 110 may be dissolved in the disulfide oil 112. For instance, in some embodiments, at least 1 weight percent (wt. %), at least 5 wt. %, at least 10 wt. %, at least 20 wt. %, at least 30 wt. %, at least 40 wt. %, at least 50 wt. %, at least 60 wt. %, at least 70 wt. %, at least 80 wt. %, at least 90 wt. %, at least 95 wt. %, at least 99 wt. %, or even 100 wt. % of the metal complex 110 may be dissolved in the disulfide oil 112. Without being bound by any particular theory, it is believed that a greater percentage of the metal complex 110 dissolved in the disulfide oil 112 may improve catalytic function of the mixed catalyst composition 118, the slurry-phase catalyst composition 128, or both the mixed catalyst composition 118 and the slurry-phase catalyst composition 128. Additionally, it is believed that a greater percentage of the metal complex 110 dissolved in the disulfide oil 112 may improve the economics of the method of making the slurry-phase catalyst composition 128.

In embodiments, the catalyst composition precursor 116 may be heated from 20° C., to 250° C. For instance, the catalyst composition precursor 116 may be heated from 20° C., to 50° C. from 20° C., to 75° C., from 20° C., to 100° C., from 20° C., to 125° C., from 20° C., to 150° C., from 20° C., to 175° C., from 20° C., to 200° C., from 20° C., to 250° C., from 50° C., to 75° C., from 50° C., to 100° C., from 50° C., to 125° C., from 50° C., to 150° C., from 50° C., to 175° C., from 50° C., to 200° C., from 50° C., to 250° C., from 75° C., to 100° C., from 75° C., to 125° C., from 75° C., to 150° C., from 75° C., to 175° C., from 75° C., to 200° C., from 75° C., to 250° C., from 100° C., to 125° C., from 100° C., to 150° C., from 100° C., to 175° C., from 100° C., to 200° C., from 100° C., to 250° C., from 125° C., to 150° C., from 125° C., to 175° C., from 125° C., to 200° C., from 125° C., to 250° C., from 150° C., to 175° C., from 150° C., to 200° C., from 150° C., to 250° C., from 175° C., to 200° C., or from 175° C., to 250° C. Without being bound by any particular theory, it is believed that at temperatures below 20° C., the metal complex 110 of the catalyst composition precursor 116 may be insoluble, or only slightly soluble in the disulfide oil 112. Additionally, it is believed that at temperatures above 250° C., the metal complex 110 may decompose.

In embodiments, the mixing vessel 114 may be heated from 20° C., to 200° C. For instance, the mixing vessel 114 may be heated from 20° C., to 50° C., from 20° C., to 75° C., from 20° C., to 100° C., from 20° C., to 125° C., from 20° C., to 150° C., from 20° C., to 175° C., from 20° C. to 200° C., from 20° C., to 250° C., from 50° C., to 75° C., from 50° C., to 100° C., from 50° C., to 125° C., from 50° C., to 150° C., from 50° C., to 175° C., from 50° C., to 200° C., from 50° C., to 250° C. from 75° C., to 100° C., from 75° C., to 125° C., from 75° C., to 150° C., from 75° C., to 175° C., from 75° C., to 200° C., from 75° C., to 250° C., from 100° C., to 125° C., from 100° C., to 150° C., from 100° C., to 175° C., from 100° C., to 200° C., from 100° C., to 250° C., from 125° C., to 150° C., from 125° C., to 175° C., from 125° C., to 200° C., from 125° C., to 250° C., from 150° C., to 175° C., from 150° C., to 200° C., from 150° C., to 250° C., from 175° C., to 200° C. or from 175° C., to 250° C. Without being bound by any particular theory, it is believed that at temperatures below 20° C., the metal complex 110 of the catalyst composition precursor 116 may be insoluble, or only slightly soluble in the disulfide oil 112. Additionally, it is believed that at temperatures above 250° C., the metal complex 110 may decompose.

In embodiments, the catalyst composition precursor 116 may be pressurized from 100 kilopascals (kPa) to autogenous pressure in the mixing vessel 114, in a separate heating vessel, or in combination thereof. For instance, the catalyst composition precursor 116 may be pressurized from 1 bar to 500 kPa, from 100 kPa to 1,000 kPa, from 100 kPa to 1,500 kPa, from 100 kPa to 2,000 kPa, from 100 kPa to 4,000 kPa, from 100 kPa to 6,000 kPa, from 100 kPa to 8,000 kPa, from 500 kPa to 1,000 kPa, from 500 kPa to 1,500 kPa, from 500 kPa to 2,000 kPa, from 500 kPa to 4,000 kPa, from 500 kPa to 6,000 kPa, from 500 kPa to 8,000 kPa, from 1,000 kPa to 1,500 kPa, from 1,000 kPa to 2,000 kPa, from 1,000 kPa to 4,000 kPa, from 1,000 kPa to 6,000 kPa, from 1,000 kPa to 8,000 kPa, from 1,500 kPa to 2,000 kPa, from 1,500 kPa to 4,000 kPa, from 1,500 kPa to 6,000 kPa, from 1,500 kPa to 8,000 kPa, or from 100 kPa to autogenous pressure. Without being bound by any particular theory, it is believed that the increased pressure of the catalyst composition precursor 116 may result in a higher concentration of the metal complex 110 in the mixed catalyst composition 118.

In embodiments, the mixed catalyst composition 118 may comprise from 100 parts per million by weight (ppmw) to 6.000 ppmw of the metal complex 110. For instance, the mixed catalyst composition 118 may comprise from 100 ppmw to 1,000 ppmw, from 100 ppmw to 2,000 ppmw, from 100 ppmw to 3,000 ppmw, from 100 ppmw to 4,000 ppmw, from 100 ppmw to 5,000 ppmw, from 100 ppmw to 6,000 ppmw, from 1,000 ppmw to 2,000 ppmw, from 1,000 ppmw to 3000 ppmw, from 1,000 ppmw to 4,000 ppmw, from 1000 ppmw to 5,000 ppmw, from 1,000 ppmw to 6,000 ppmw, from 2,000 ppmw to 3,000 ppmw, from 2,000 ppmw to 4,000 ppmw, from 2,000 ppmw to 5,000 ppmw, from 2,000 ppmw to 6,000 ppmw, from 3,000 ppmw to 4,000 ppmw, from 3,000 ppmw to 5,000 ppmw, from 3,000 ppmw to 6,000 ppmw, from 4,000 ppmw to 5,000 ppmw, from 4,000 ppmw to 6,000 ppmw, or from 5,000 ppmw to 6,000 ppmw of the metal complex 110. In some embodiments, the mixed catalyst composition 118 may comprise a concentration of the metal complex 110 that may be greater than a solubility limit of the metal complex 110. Without being bound by any particular theory, it is believed that at concentrations below 100 ppmw, there may be an insufficient amount of the metal complex 110 present in the mixed catalyst composition 118 for a catalytic reaction to proceed. On the contrary, it is believed that at concentrations above 6000 ppmw, there may be a greater portion of the metal complex 110 out of solution in the mixed catalyst composition 118, which may increase operational costs.

In some embodiments, the mixed catalyst composition 118 may comprise a liquid component and a solid component. In some embodiments, the mixed catalyst composition 118 may be transferred to a separation unit 120 where a liquid component and a solid component of the mixed catalyst composition 118 are separated to form a separated liquid component 122 and a separated solid component 124. In some embodiments, the separation unit 120 may be a solid settling vessel operable to cause an amount of the solid component of the mixed catalyst composition 118 to settle and an amount of the liquid component to remain in solution.

In some embodiments, the separated liquid component 122 may be transferred to a slurry-phase hydrocracking unit 126 to form a slurry-phase catalyst composition 128.

In embodiments, the operating conditions of the slurry-phase hydrocracking unit 126 may include a minimum hydrogen partial pressure from 5,000 kPa (50 bar) to 25,000 kPa (250 bar). For example, the minimum hydrogen partial pressure may be from 5,000 kPa to 10,000 kPa, from 5,000 kPa to 15,000 kPa, from 5,000 kPa to 20,000 kPa, from 5,000 kPa to 25.000 kPa, from 10,000 kPa to 15,000 kPa, from 10,000 kPa to 20,000 kPa, from 10,000 kPa to 25,000 kPa, from 15,000 kPa to 20,000 kPa, from 15,000 kPa to 25,000 kPa, or from 20,000 kPa to 25,000 kPa.

In embodiments, the operating conditions of the slurry-phase hydrocracking unit 126 may include an operating temperature from 100° C., to 550° C. For example, the operating temperature may be from 100° C., to 200° C., from 100° C., to 300° C., from 100° C., to 400° C., from 100° C., to 500° C. 100° C., to 550° C., from 200° C., to 300° C., from 200° C., to 400° C., from 200° C. to 500° C., from 200° C., to 550° C., from 300° C., to 400° C., from 300° C., to 500° C., from 300° C., to 550° C., from 400° C., to 500° C., from 400° C., to 550° C., from 450° C., to 500° C., or from 500° C., to 550° C.

In embodiments, the operating conditions of the slurry-phase hydrocracking unit 126 may include a hydrogen feed rate from 500 standard liters of hydrogen to 1 liter of oil (StLt/L) to 2500 StLt/L. For example, the hydrogen feed rate may be from 500 StLt/L to 1000 StLt/L, from 500 StLt/L to 1500 StLt/L, from 500 StLt/L to 2000 StLt/L, from 500 StLt/L to 2500 StLt/L, from 1000 StLt/L to 1500 StLt/L, from 1000 StLt/L to 2000 StLt/L, from 1000 StLt/L to 2500 StLt/L, from 1500 StLt/L to 2000 StLt/L, from 1500 StLt/L to 2500 StLt/L, or from 2000 StLt/L to 2500 StLt/L.

In embodiments, the operating conditions of the slurry-phase hydrocracking unit 126 may include a hydrogen consumption rate from 100 StLt/L to 2000 StLt/L. For example, the hydrogen consumption rate may be from 100 StLt/L to 250 StLt/L, from 100 StLt/L to 500 StLt/L, from 100 StLt/L to 1000 StLt/L, from 100 StLt/L to 1500, from 100 StLt/L to 2000 StLt/L, from 500 StLt/L to 1000 StLt/L, from 500 StLt/L to 1500, from 500 StLt/L to 2000 StLt/L, from 1000 StLt/L to 1500, or from 1000 StLt/L to 2000 StLt/L.

In embodiments, the hydrogen feed rate may be approximated by a multiple of the hydrogen consumption rate. For instance, the hydrogen feed rate may be 2 times, 3 times, or even 4 times the hydrogen consumption rate.

In embodiments, the separated solid component 124 may be transferred to the mixing vessel 114. Without being bound by any particular theory, it is believed that recycling the separated solid component 124 to the mixing vessel 114 may result in reduced operational cost of the method of making the slurry-phase catalyst composition 128.

In embodiments, slurry-phase catalyst composition 128 may comprise from 100 parts per million by weight (ppmw) to 10,000 ppmw of the metal complex 110. For instance, the slurry-phase catalyst composition 128 may comprise from 100 ppmw to 1.000 ppmw, from 100 ppmw to 2,000 ppmw, from 100 ppmw to 3,000 ppmw, from 100 ppmw to 4,000 ppmw, from 100 ppmw to 5,000 ppmw, from 100 ppmw to 6,000 ppmw, from 1,000 ppmw to 2,000 ppmw, from 1,000 ppmw to 3,000 ppmw, from 1,000 ppmw to 4,000 ppmw, from 1,000 ppmw to 5,000 ppmw, from 1,000 ppmw to 6,000 ppmw, from 1.000 ppmw to 10,000 ppmw, from 2,000 ppmw to 3,000 ppmw, from 2,000 ppmw to 4,000 ppmw, from 2,000 ppmw to 5,000 ppmw, from 2,000 ppmw to 6,000 ppmw, from 2,000 ppmw to 10,000 ppmw, from 3,000 ppmw to 4,000 ppmw, from 3,000 ppmw to 5,000 ppmw, from 3,000 ppmw to 6,000 ppmw, from 3,000 ppmw to 10,000 ppmw, from 4,000 ppmw to 5,000 ppmw, from 4,000 ppmw to 6,000 ppmw, from 4,000 ppmw to 10,000 ppmw, from 5,000 ppmw to 6,000 ppmw, or from 5,000 ppmw to 10,000 ppmw of the metal complex 110. In some embodiments, the slurry-phase catalyst composition 128 may comprise a concentration of the metal complex 110 that may be greater than a solubility limit of the metal complex 110. Without being bound by any particular theory, it is believed that at concentrations below 100 ppmw, there may be an insufficient amount of the metal complex 110 present in the slurry-phase catalyst composition 128 for a catalytic reaction to proceed, or to proceed at an economical rate. On the contrary, it is believed that the metal complex 110 may not dissolve in the disulfide oil 112 at concentrations above 10,000 ppmw.

As such, embodiments provided herein may improve the solubility of a metal complex, reduce waste production from a MEROX process, and improve function and economics of slurry-phase hydrocracking.

According to an aspect, either alone or in combination with any other aspect, a method of making a slurry-phase catalyst composition, the method comprising: mixing a metal complex and a disulfide oil in a mixing vessel to form a catalyst composition precursor; heating the catalyst composition precursor to an elevated temperature sufficient to dissolve at least a portion of the metal complex in the disulfide oil to form a mixed catalyst composition, wherein the mixed catalyst composition comprises both a liquid component and a solid component; transferring at least a portion of the mixed catalyst composition to a slurry-phase hydrocracking unit to form the slurry-phase catalyst composition.

According to a second aspect, either alone or in combination with any other aspect, the metal complex comprises molybdenum, cobalt, nickel, tungsten, or a combination of two or more thereof.

According to a third aspect, either alone or in combination with any other aspect, the metal complex comprises bis (acetylacetonato)dioxomolybdenum(VI), molybdenum trioxide, molybdenum hexacarbonyl, or a combination of two or more thereof.

According to a fourth aspect, either alone or in combination with any other aspect, the disulfide oil is a reaction product of a mercaptan oxidation reaction.

According to a fifth aspect, either alone or in combination with any other aspect, the disulfide oil comprises dimethyldisulfide, diethyldisulfide, methylethyldisulfide, or a combination of two or more thereof.

According to a sixth aspect, either alone or in combination with any other aspect, the mixing vessel is heated to a temperature from 20° C., to 250° C.

According to a seventh aspect, either alone or in combination with any other aspect, the mixing vessel is pressurized from 1 bar to autogenous pressure.

According to an eighth aspect, either alone or in combination with any other aspect, further comprising separating the liquid component from the solid component of the mixed catalyst composition to form a separated liquid component and a separated solid component.

According to a ninth aspect, either alone or in combination with any other aspect, the separated liquid component is transferred to the slurry-phase hydrocracking unit to form the slurry-phase catalyst composition.

According to a tenth aspect, either alone or in combination with any other aspect, the solid component is separated from the liquid component by introducing the mixed catalyst composition to a solid settling vessel.

According to an eleventh aspect, either alone or in combination with any other aspect, further comprising recycling the separated solid component to the mixing vessel.

According to a twelfth aspect, either alone or in combination with any other aspect, the slurry-phase hydrocracking unit comprise hydrogen, and wherein the operating conditions of the slurry-phase hydrocracking unit comprise a minimum hydrogen partial pressure from 5,000 kPa to 25,000 kPa and an operating temperature from 100° C., to 500° C.

According to a thirteenth aspect, either alone or in combination with any other aspect, a slurry-phase catalyst composition comprises a metal complex and a disulfide oil; wherein the disulfide oil is a reaction product of a mercaptan oxidation reaction, and the metal complex is dissolved in the disulfide oil to form a mixed catalyst composition, and at least a portion of the mixed catalyst composition is transferred to a slurry-phase hydrocracking unit to form the slurry-phase catalyst composition.

According to a fourteenth aspect, either alone or in combination with any other aspect, the metal complex comprises molybdenum, cobalt, nickel, tungsten, or a combination of two or more thereof.

According to a fifteenth aspect, either alone or in combination with any other aspect, the metal complex comprises ligands, organometallics, salts, oxides, sulfides, or combinations thereof.

According to a sixteenth aspect, either alone or in combination with any other aspect, the metal complex comprises ligands comprising oxygen groups, and wherein the oxygen groups are bonded to a metal.

According to a seventeenth aspect, either alone or in combination with any other aspect, the metal complex comprises bis(acetylacetonato)dioxomolybdenum(VI), molybdenum trioxide, molybdenum hexacarbonyl, or a combination of two or more thereof.

According to an eighteenth aspect, either alone or in combination with any other aspect, the disulfide oil comprises dimethyldisulfide, diethyldisulfide, methylethyldisulfide, or a combination of two or more thereof.

According to a nineteenth aspect, either alone or in combination with any other aspect, a concentration of the metal complex is greater than a solubility limit of the metal complex.

According to a twentieth aspect, either alone or in combination with any other aspect, a concentration of the metal complex is from 100 parts per million by weight (ppmw) to 10,000 ppmw.

EXAMPLES

The various embodiments disclosed herein will be further clarified by the following examples. The examples are illustrative in nature, and should not be understood to limit the embodiments disclosed herein.

Example 1. Composition of Disulfide Oil Mixture from MEROX Process

A disulfide oil mixture is produced in a mercaptan oxidation (MEROX) reaction. Disulfide oil compounds produced may vary based on the type and efficiency of the reaction. For instance, a MEROX unit designed for the recovery of propane and butane yields a disulfide oil with a composition described in Table 1. The reported weight percent is calculated using semi-quantitative gas chromatography-mass spectrometry (GC-MS). The total sulfur content is measured quantitatively using energy dispersive x-ray fluorescence.

TABLE 1

| Disulfide oil | Weight % | Boiling point (° C.) | Molecular weight (g/mol) | Sulfur weight % |
|---|---|---|---|---|
| Dimethyldisulfide | 15.7 | 110 | 94 | 68.1 |
| Diethyldisulfide | 33.5 | 152 | 122 | 52.5 |
| Methylethyldisulfide | 49.3 | 121 | 108 | 59.3 |
| Total, (Average) | 98.4 | (128) | (109) | (57.5) |

Example 2. Solubility of Molybdenum Complex at 20° C.

Figure 2:
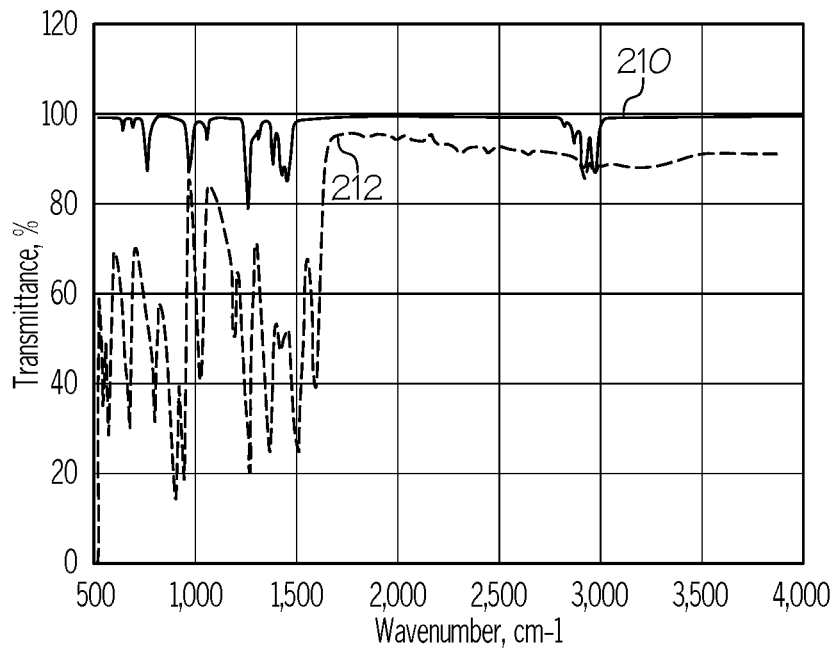
FIG. 2 is FTIR spectra, according to one or more embodiments described herein.

The solubility of bis(acetylacetonato)dioxomolybdenum (VI) (Mo complex) (CAS #17524-05-9) in the disulfide oil mixture of Example 1 is evaluated at 20° C. Specifically, the Mo complex is added to 16.0177 grams (g) of the disulfide oil mixture at 0.01 g increments. 0.0481 g of the Mo complex is added to 16.0177 g of the disulfide oil mixture, corresponding to a concentration of 3000 parts per million by weight (ppmw). The mixture is filtered through filter paper to separate the liquid phase from the solid phase. The solids are washed with pentane until the filtrate is clear. The solid sample is dried at 80° C., for 1 hour. The Mo complex in the disulfide oil is analyzed using a fourier-transform infrared (FTIR) spectrometer. Additionally, the solid Mo complex as a control is analyzed using the FTIR spectrometer. The FTIR spectra of the Mo complex in disulfide oil 210 and the comparative Mo complex 212 are shown in FIG. 2. As demonstrated in FIG. 2, the Mo complex in disulfide oil 210 spectrum has similar peak positions based on the wavenumber compared to the comparative Mo complex 212 spectrum, but the transmittance of the Mo complex in disulfide oil 210 is much greater, suggesting a portion of the Mo complex is insoluble in the disulfide oil. The molybdenum concentration of the liquid phase is analyzed using inductively coupled plasma-atomic emission spectroscopy (ICP-AES). The molybdenum concentration of the liquid phase is 448 ppmw of molybdenum or 1528 ppmw of the Mo complex.

Example 3. Solubility of Molybdenum Complex at 80° C.

Figure 3:
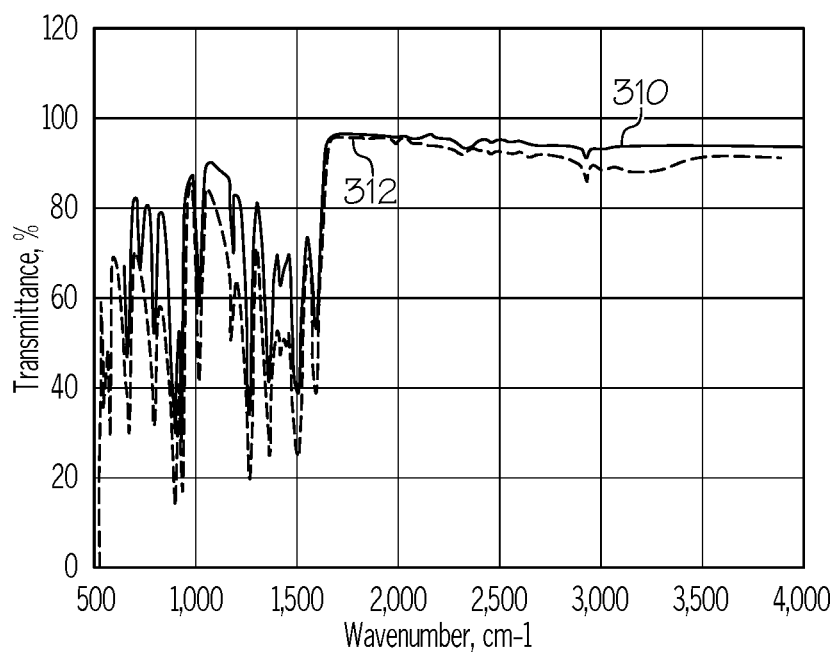
FIG. 3 is FTIR spectra, according to one or more embodiments described herein.

The solubility of bis(acetylacetonato)dioxomolybdenum (VI) (Mo complex) in the disulfide oil mixture of Example 1 is evaluated at 80° C. Specifically, 5 g of the Mo complex is added to 15 g of the disulfide oil mixture in an Erlenmeyer flask and refluxed at 80° C., for 1 hour. The reflux column is cooled to 5° C. The mixture is cooled to room temperature and filtered through filter paper to separate the liquid phase from the solid phase. The solids are washed with pentane until the filtrate is clear. The solid sample is dried at 80° C., for 1 hour. The liquid phase is analyzed using a FT-IR spectrometer. Additionally, the solid Mo complex as a control is analyzed using the FT-IR spectrometer. The FTIR spectra of the Mo complex in disulfide oil 310 and the comparative Mo complex 312 is shown in FIG. 3. As demonstrated in FIG. 3, the Mo complex in disulfide oil 310 spectrum closely resembles the comparative Mo complex 312 spectrum, suggesting the Mo complex is dissolved in the disulfide oil. The molybdenum concentration of the liquid phase, as determined by the molybdenum analysis described above in Example 2, is 1687 ppmw of molybdenum or 5265 ppmw of the Mo complex.

It will be apparent to persons of ordinary skill in the art that various modifications and variations can be made without departing from the scope disclosed herein. Since modifications, combinations, sub-combinations, and variations of the disclosed embodiments, which incorporate the spirit and substance disclosed herein, may occur to persons of ordinary skill in the art, the scope disclosed herein should be construed to include everything within the scope of the appended claims and their equivalents.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A. B. and C should be interpreted as also disclosing a composition "consisting of" components A. B. and C as well as a composition "consisting essentially of" components A. B. and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter disclosed herein has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A slurry-phase catalyst composition comprising:
a metal complex; and
a disulfide oil;
wherein:
the disulfide oil is a reaction product of a mercaptan oxidation reaction;
the disulfide oil comprises oils having the formula R—S—S—R', where R and R' are independently $C_1$-$C_{20}$ hydrocarbon chains;
at least 20 wt. % of the metal complex is dissolved in the disulfide oil to form a mixed catalyst composition;
at least a portion of the mixed catalyst composition is transferred to a slurry-phase hydrocracking unit to form the slurry-phase catalyst composition; and
the slurry-phase catalyst composition is a homogenous catalyst.

2. The composition of claim 1, wherein the metal complex comprises molybdenum, cobalt, nickel, tungsten, or a combination of two or more thereof.

3. The composition of claim 1, wherein the metal complex comprises ligands, organometallics, salts, oxides, sulfides, or combinations thereof.

4. The composition of claim 1, wherein the metal complex comprises ligands comprising oxygen groups, and wherein the oxygen groups are bonded to a metal.

5. The composition of claim 1, wherein the metal complex comprises bis(acetylacetonato)dioxomolybdenum(VI), molybdenum trioxide, molybdenum hexacarbonyl, or a combination of two or more thereof.

6. The composition of claim 1, wherein the disulfide oil comprises dimethyldisulfide, diethyldisulfide, methylethyldisulfide, or a combination of two or more thereof.

7. The composition of claim 1, wherein a concentration of the metal complex is greater than a solubility limit of the metal complex.

8. The composition of claim 1, where a concentration of the metal complex is from 100 parts per million by weight (ppmw) to 10,000 ppmw.

9. The composition of claim 1, wherein at least 50 wt. % of the metal complex is dissolved in the disulfide oil.

10. A method of making the slurry-phase catalyst composition of claim 1, the method comprising:
mixing the metal complex and the disulfide oil, which is the reaction product of mercaptan oxidation, in a mixing vessel to form a catalyst composition precursor;
heating the catalyst composition precursor to an elevated temperature sufficient to dissolve at least a portion of the metal complex in the disulfide oil to form the mixed catalyst composition, wherein the mixed catalyst composition comprises both a liquid component and a solid component; and transferring at least the portion of the mixed catalyst composition to the slurry-phase hydrocracking unit to form the slurry-phase catalyst composition.

11. The method of claim 10, wherein the metal complex comprises molybdenum, cobalt, nickel, tungsten, or a combination of two or more thereof.

12. The method of claim 10, wherein the metal complex comprises bis(acetylacetonato)dioxomolybdenum(VI), molybdenum trioxide, molybdenum hexacarbonyl, or a combination of two or more thereof.

13. The method of claim 10, wherein the disulfide oil comprises dimethyldisulfide, diethyldisulfide, methylethyldisulfide, or a combination of two or more thereof.

14. The method of claim 10, wherein the mixing vessel is heated to a temperature from 20° C., to 250° C.

15. The method of claim 10, wherein the mixing vessel is pressurized from 1 bar to autogenous pressure.

16. The method of claim 10, further comprising separating the liquid component from the solid component of the mixed catalyst composition to form a separated liquid component and a separated solid component.

17. The method of claim 16, wherein the separated liquid component is transferred to the slurry-phase hydrocracking unit to form the slurry-phase catalyst composition.

18. The method of claim 16, wherein the solid component is separated from the liquid component by introducing the mixed catalyst composition to a solid settling vessel.

19. The method of claim 16, further comprising recycling the separated solid component to the mixing vessel.

20. The method of claim 10, wherein the slurry-phase hydrocracking unit comprise hydrogen, and wherein the operating conditions of the slurry-phase hydrocracking unit comprise a minimum hydrogen partial pressure from 5,000 kPa to 25,000 kPa and an operating temperature from 100° C., to 500° C.

* * * * *